United States Patent [19]
Zaiser

[11] 3,844,393
[45] Oct. 29, 1974

[54] ACTUATING MECHANISM FOR ENGAGEABLE DEVICES IN PLANETARY GEAR TRANSMISSIONS

[75] Inventor: Wolfgang Zaiser, Althutte, Germany

[73] Assignee: Daimler-Benz Aktiengesellschaft, Stuttgart, Germany

[22] Filed: Sept. 8, 1972

[21] Appl. No.: 287,217

[30] Foreign Application Priority Data
Sept. 9, 1971 Germany.......................... 2145106

[52] U.S. Cl........... 192/87.11, 192/87.15, 192/88 A
[51] Int. Cl............................................. F16d 25/00
[58] Field of Search............ 192/88 A, 87.15, 87.11, 192/3.3, 3.33

[56] References Cited
UNITED STATES PATENTS

| 3,239,037 | 3/1966 | Croswhite et al. | 192/88 A X |
| 3,279,573 | 10/1966 | Hensel | 192/87.15 X |
| 3,338,358 | 8/1967 | Christenson et al. | 192/88 A X |
| 3,548,986 | 12/1970 | Fisher | 192/88 A X |
| 3,744,606 | 7/1973 | Bucksch | 192/87.15 |
| 3,746,138 | 7/1973 | Forster et al. | 192/87.11 |
| 3,747,727 | 7/1973 | Dach et al. | 192/87.11 X |

Primary Examiner—Samuel Scott
Assistant Examiner—Lance W. Chandler
Attorney, Agent, or Firm—Craig & Antonelli

[57] ABSTRACT

An actuating mechanism for two engageable friction devices arranged concentrically one about the other of a planetary gear change-speed transmission, especially for two input clutches of a motor vehicle change-speed transmission in which the two engageable friction devices constructed as lamellae friction clutches each include an actuating piston which are located to the same side of the two engageable devices; the actuating piston of at least the radially outwardly disposed engageable device is connected rigidly and sealingly with a spring disk that forms simultaneously the delimitation of the pressure space and the return spring.

13 Claims, 1 Drawing Figure

PATENTED OCT 29 1974　　　　　　　　　　　　　　3,844,393
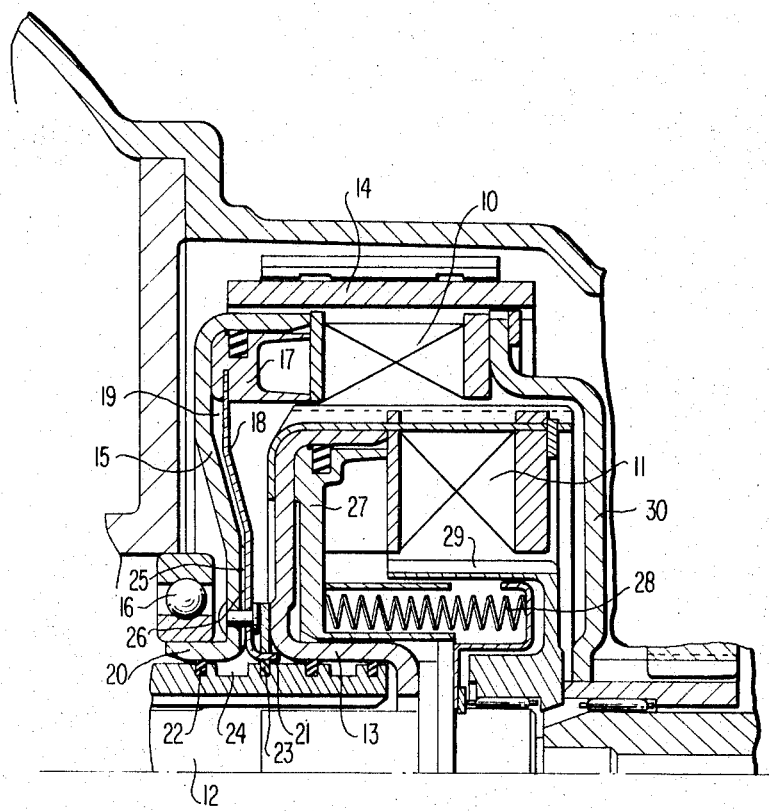

ACTUATING MECHANISM FOR ENGAGEABLE DEVICES IN PLANETARY GEAR TRANSMISSIONS

The present invention relates to an actuating mechanism for two frictional engaging devices arranged concentrically one about the other of a planetary gear change-speed transmission, especially for two input clutches of a motor vehicle change-speed transmission, whereby the two engageable friction devices constructed as lamellae friction clutches include actuating pistons that are disposed on the same side of the two engageable friction devices.

Motor vehicle transmissions are known in the prior art in which one friction brake and one friction clutch as well as a second friction clutch are arranged at the input. All three engageable friction devices are thereby disposed one about the other in the diametric direction, however, by reason of the return springs for their actuating pistons they are mutually axially offset (German Offenlegungsschrift 1,943,984). The disadvantage of this prior art arrangement resides in particular in that axially a considerable space is necessitated for the accommodation of the return springs. The present invention is now concerned with the task to avoid this disadvantage, i.e., a construction is to be realized in which axially as little space as possible is required.

The underlying problems are solved according to the present invention with the actuating mechanisms of the aforementioned type in that the actuating piston of at least the radially outwardly disposed friction-shifting mechanism is securely and sealingly connected with a spring disk which at the same time constitutes the boundary of the pressure space and the return spring. The present invention thereby contemplates primarily a transmission which includes two input clutches. In such a transmission, the actuating pistons may be nested one within the other in such a manner that the actuating piston of the outer clutch forms the annular space for the actuating piston of the inner clutch. The present invention is also applicable to such an arrangement whereby under certain circumstances, the spring disk may be additionally supported.

The construction of the present invention offers the advantage that axially only very little space is required. The two friction shifting devices can therefore be disposed concentrically one about the other.

It is additionally proposed by the present invention that the spring disk is non-rotatably connected at its inner circumference with a support flange so as to rotate in unison therewith, which at its outer circumference is non-rotatably connected with the outer lamellae or disk carrier so as to rotate in unison therewith. A further feature of the present invention resides in that the support flange passes over at the inner circumference into a sleeve portion extending axially opposite to the clutch, and the spring disk passes over at the inner circumference into a sleeve portion extending axially toward the clutch. This construction is applicable analogously also when this friction-shifting device acts as brake.

Furthermore, it is proposed according to the present invention that both sleeve portions are sealed off so that the inner circumference for the purpose of the pressure medium supply and the space disposed therebetween is in communication with the pressure space of the actuating mechanism by way of passages in the support flange. In detail, this can be realized according to the present invention in that the passages are constituted by star-like grooves arranged in the end face of the support flange intended for the abutment of the spring disk.

Accordingly, it is an object of the present invention to provide an actuating mechanism for engageable friction devices in change-speed transmissions, especially in planetary change-speed transmissions of motor vehicles which avoids the aforementioned shortcomings and drawbacks encountered in the prior art by extremely simple means.

Another object of the present invention resides in an actuating mechanism for engageable friction devices in planetary change-speed transmissions which requires axially only a small amount of space so that a true concentric arrangement of the engageable friction devices one about the other is possible.

A further object of the present invention resides in a construction of an actuating mechanism of the type described above which not only reduces the axial space requirements but permits a simple construction of the parts necessary for the hydraulic actuating system.

These and other objects, features and advantages of the present invention will become more apparent from the following description when taken in connection with the accompanying drawing which shows, for purposes of illustration only, one embodiment in accordance with the present invention, and wherein:

The single FIGURE is a partial longitudinal cross-sectional view through an actuating mechanism with two input clutches in accordance with the present invention.

Referring now to the single FIGURE of the drawing, two input clutches 10 and 11 are arranged concentrically about one another at the input of a planetary gear change-speed transmission of any conventional type, not shown in detail. Since the input clutches 10 and 11 and their friction disks or lamellae are of conventional construction, they are shown only schematically. The input shaft 12 is rigidly connected with a flange member 13 which outwardly thereof forms at the same time the inner lamellae or disk carrier for the outer clutch 10 and the outer lamellae or disk carrier for the inner clutch 11. The outer lamellae or disk carrier 14 of the outer clutch 10 is non-rotatably connected with a support flange 15 for rotation in unison therewith, which is rotatably supported in the housing of the transmission by means of a conventional anti-friction roller bearing 16. The actuating piston 17 of the outer clutch 10 is non-rotatably and sealingly connected with a spring disk 18 which at the inner circumference is non-rotatably connected in its turn with the support flange 15, for example, by means of rivets. This spring disk 18 forms simultaneously the return spring for the actuating piston 17 and the delimitation or boundary of the pressure space 19 between the support flange 15 and the spring disk 18. In this manner, very little space for the actuating mechanism is required--as can be readily seen from the drawing.

The support flange 15 is provided at its inner circumference with a sleeve portion 20 which is directed opposite to the clutch 10. The spring disk 18 is also provided at its inner circumference with a sleeve portion 21 which is directed toward the clutch 10. Both sleeve portions 20 and 21 are sealed off inwardly thereof by means of seals 22 and 23, and a pressure space 24 for the supply of the pressure medium is disposed between the seals 22 and 23. The support flange 15 is provided at its end face 25 with star-like grooves 26 which connect the pressure space 24 with the pressure space 19.

The actuating piston 27 of the inner clutch 11 is equipped in the usual manner with a coil spring 28 as return spring. However, also in this case, a corresponding spring disk may be provided as with the outer clutch 10.

The inner lamellae or disk carrier 29 of the inner clutch 11 leads to an input member (not shown) of the transmission whereas the outer lamellae or disk carrier 14 of the outer clutch 10 is operatively connected by way of a flange member 30 with another input member of the transmission (not shown).

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An actuating mechanism for a change-speed transmission arrangement, comprising: a housing, two concentrically disposed frictional engaging means provided in said housing, an actuating piston means operatively connected with each of said frictional engaging means, each of said actuating piston means being located on the same side of said two frictional engaging means, a support flange means disposed in said housing for rotatably supporting at least one of said two frictional engaging means, a spring disk means non-rotatably connected at its outer circumference with the actuating piston operatively connected with said radially outwardly disposed fricitonal engaging means for returning said radially outwardly disposed frictional engaging means to a disengaged position, said spring disk means simultaneously forming a boundary of a pressure space for receiving a pressure medium to selectively cause engagement of said radially outwardly disposed frictional engaging means, and additional spring means operatively connected with the other fricitonal engaging means for returning the same to a disengaged position.

2. An actuating mechanism according to claim 1, wherein the change-speed transmission is a planetary change-speed transmission.

3. An actuating mechanism according to claim 2, wherein said two frictional engaging means are input clutches of a motor vehicle change-speed transmission.

4. An actuating mechanism according to claim 3, wherein said input clutches are constructed as lamellae friction clutches.

5. An actuating mechanism according to claim 4, wherein said spring disk means in non-rotatably connected at its inner circumference with said support flange means and wherein said radially outwardly disposed engageable friction means is provided with an outer disk carrier, the outer circumference of said support flange means being non-rotatably connected with said outer disk carrier.

6. An actuating mechanism for a change-speed transmission arrangement, comprising: a housing, two concentrically disposed frictional engaging means provided in said housing, an actuating piston means operatively connected with each of said frictional engaging means, each of said actuating piston means being located on the same side of said two frictional engaging means, a support flange means disposed in said housing for rotatably supporting at least one of said two frictional engaging means, a spring disk means operatively connected with at least the radially outwardly disposed frictional engaging means for returning said frictional engaging means to a disengaged position, said spring disk means simultaneously forming a boundary of a pressure space for receiving a pressure medium to selectively cause engagement of said radially outwardly disposed frictional engaging means, additional spring means operatively connected with the other frictional engaging means for returning the same to a disengaged position, the change-speed transmission being a planetary change-speed transmission, said two frictional engaging means being input clutches of a motor vehicle change-speed transmission constructed as lamellae friction clutches, said spring disk means being non-rotatably connected at its inner circumference with said support flange means, said radially outwardly disposed engageable friction means being provided with an outer disk carrier, the outer circumference of said support flange means being non-rotatably connected with said outer disk carrier, said support flange means being provided at its inner circumference with a sleeve portion extending axially opposite said radially outwardly disposed frictional engaging means, and said spring disk means being provided at its inner circumference with a sleeve portion extending axially toward said radially outwardly disposed frictional engaging means.

7. An actuating mechanism according to claim 6, wherein means are provided for sealing both of said sleeve portions at the inner circumference for the pressure medium supply said sealing means defining therebetween an additional pressure space, and wherein means are provided for communicating said additional pressure space with the pressure space of the actuating piston for said radially outwardly disposed frictional engaging means.

8. An actuating mechanism according to claim 7, wherein said means for communicating consist of passage means provided in said support flange means.

9. An actuating mechanism for a planetary change-speed transmission of a motor vehicle, comprising: two concentrically disposed frictional engaging means, an acutating piston operatively connected to each of said frictional engaging means, each of said actuating piston being located on the same side of said two frictional engaging means, a support flange means for rotatably supporting at least one of said two frictional engaging means, a spring disk means operatively connected with at least the radially outwardly disposed frictional engaging means for returning said frictional engaging means to a disengaged position, said support flange means simultaneously forming the boundary of a pressure space for receiving a pressure medium to cause selective engagement of said radially outwardly disposed frictional engaging means, said spring disk means being non-rotatably connected at its inner circumference with said support flange means, said radially outwardly disposed frictional engaging means being provided with an outer disk carrier with the outer circumference of said spring disk means being non-rotatably secured thereto, a first sleeve portion provided at the inner circumference of said support flange means, said first sleeve portion extending axially opposite said radially outwardly disposed frictional engaging means, a second sleeve portion provided at the inner circumference of said spring disk means, said second sleeve portion extending axially toward said radially outwardly disposed frictional engaging means, means for sealing both said sleeve portions at the inner circumference for the pressure medium supply, said sealing means defining therebetween an additional pressure space, and means for communicating said additional pressure space with the pressure space of said actuating piston for said radially outwardly disposed frictional engaging means, said means for communicating consisting of passage means formed by star-like grooves provided in an end face of said support flange means for abutting said spring disk means, said frictional engaging means being constructued as lamellae friction input clutches of the motor vehicle change-speed transmission.

10. An actuating mechanism according to claim 1, wherein said spring disk means is non-rotatably connected at its inner circumference with said support flange means and wherein said radially outwardly disposed engageable friction means is provided with an outer disk carrier, the outer circumference of said support flange means being non-rotatably connected with said outer disk carrier.

11. An actuating mechanism for a change-speed transmission arrangement, comprising: a housing, two concentrically disposed frictional engaging means provided in said housing, an actuating piston means operatively connected with each of said frictional engaging means, each of said actuating piston means being located on the same side of said two frictional engaging means, a support flange means disposed in said housing for rotatably supporting at least one of said two frictional engaging means, a spring disk means operatively connected with at least the radially outwardly disposed frictional engaging means for returning said frictional engaging means to a disengaged position, said spring disk means simultaneously forming a boundary of a pressure space for receiving a pressure medium to selectively cause engagement of said radially outwardly disposed frictional engaging means, additional spring means operatively connected with the other frictional engaging means for returning the same to a disengaged position, said spring disk means being non-rotatably connected at its inner circumference with said support flange means, said radially outwardly disposed engageable friction means being provided with an outer disk carrier, the outer circumference of said support flange means being non-rotatably connected with said outer disk carrier, said support flange means being provided at its inner circumference with a sleeve portion extending axially opposite said radially outwardly disposed frictional engaging means, and said spring disk means being provided at it inner circumference with the sleeve portion extending axially toward said radially outwardly disposed frictional engaging means.

12. An actuating mechanism according to claim 11, wherein means are provided for sealing both of said sealed portions at the inner circumference for the pressure medium supply, said sealing means defining therebetween an additional pressure space, and wherein means are provided for communicating said additional pressure space with the pressure space of the actuating piston for said radially outwardly disposed frictional engaging means.

13. An actuating mechanism for a change-speed transmission arrangement, comprising: two concentrically disposed frictional engaging means, an actuating piston operatively connected to each frictional engaging means, each of said actuating piston means being located on the same side of said two frictional engaging means, a support flange means disposed in said housing for rotatably supporting at least one of said two frictional engaging means, a spring disk means operatively connected with at least the radially outwardly disposed frictional engaging means for returning said frictional engaging means to a disengaged position, said spring disk means simultaneously forming with said support flange means the boundary of a pressure space for receiving a pressure medium to selectively cause engagement of said radially outwardly disposed frictional engaging means, said support flange means being non-rotatably connected at its inner circumference with said support flange means, said radially outwardly disposed frictional engaging means being provided with an outer disk carrier with the outer circumference of said spring disk means being non-rotatably secured thereto, a first sleeve portion provided at the inner circumference of said support flange means, said first sleeve portion extending axially opposite said radially outwardly disposed frictional engaging means, a second sleeve portion provided at the inner circumference of said spring disk means, said second sleeve portion extending axially toward said radially outwardly disposed frictional engaging means, means for sealing both of said sleeve portions at the inner circumference for the pressure medium supply, said sealing means defining therebetween an additional pressure space, and means for communicating said additional pressure space with the pressure space of said actuating piston for said radially outwardly disposed frictional engaging means, said means for communicating consisting of passage means formed by star-like grooves provided in an end face of said support flange means for abutting said spring disk means.

* * * * *